United States Patent Office 2,939,894
Patented June 7, 1960

2,939,894

ISOMERIZATION OF LIGHT PETROLEUM DISTILLATES EMPLOYING CATALYST COMPRISING IRON-GROUP METAL ON LITHIUM-MODIFIED ACIDIC MIXED OXIDES SUPPORT

Hillis O. Folkins and Kenneth E. Lucas, Crystal Lake, Ill., assignors to The Pure Oil Company, Chicago, Ill., a corporation of Ohio No Drawing. Filed Nov. 19, 1956, Ser. No. 622,795

6 Claims. (Cl. 260—683.65)

This invention relates to the isomerization of saturated isomerizable hydrocarbons with promoted catalysts comprising refractory, mixed oxides supports composited to evince acidic properties and hydrocarbon cracking activity. It more specifically relates to improving the efficiency of a refractory, mixed oxides base, composited to evince acidic properties and hydrocarbon cracking activity, which has corporated therein a minor amount of a heavy metal of the iron group, for use in isomerizing saturated hydrocarbons.

Isomerization as a unit process has found considerable application in the petroleum industry. Structural as well as position isomerization is fundamentally important as a gas-conversion process for the preparation of feed stocks for use in alkylation units. In addition, because of the increased octane number of branched-chain hydrocarbons, the process also has application in converting low-octane number hydrocarbons or low-boiling petroleum distillates into blending stocks having high octane numbers. Generally, motor fuels of the gasoline type are composite blends of several petroleum-derived fractions. In these blends, light straight-run naphthas boiling between 100°–250° F. constitute from 10 to 25% of the total composition. These light straight-run naphthas, consisting essentially of saturated hydrocarbons, have low octane numbers and it is desirable to improve their anti-knock value. This improvement in anti-knock value is especially significant in the manufacture of fuels for use in modern, high-output, high-speed, spark-ignited, internal combustion engines which require fuels having high octane numbers. Although it has been standard practice in the petroleum industry to subject low octane number distillate stocks to reforming operations to enhance their blending value, the use of isomerization processes in the up-grading of specific distillate stocks is advantageous because it permits better yield-octane number improvement than reforming processes.

In promoting the efficiency of isomerization reactions, Friedel-Crafts-type catalysts, especially aluminum chloride, have had wide use because they are fairly effective and economical; however, there are a number of disadvantages in employing Friedel-Crafts catalysts, such as corrosivity due to the use of acid promoters, sludging tendencies of the catalyst, sensitivity to impurities in the feed stock, and others. Although it is advantageous to conduct unit processes in the liquid phase, as is employed in isomerization processes using Friedel-Crafts catalysts, because the heat input is less and smaller equipment is required, the disadvantages of Friedel-Crafts-type catalysts make it desirable to sacrifice these advantages for a vapor-phase process employing catalysts which may be more easily handled. Catalysts developed for use in vapor-phase isomerization processes employ solid materials which will promote the efficiency of the reaction and which have structural properties which permit their use, if desired, in a moving catalyst system. To this end, a number of solid catalysts have been extensively investigated. Because it is recognized that effective catalysts for isomerization have acidic characteristics, a number of oxide mixtures which may react or unite to form a complex having acidic characteristics have been studied. The common silica-alumina cracking catalyst is an example of this type of catalyst. Although neither silica nor alumina has decidedly acidic characteristics, these substances may unite in such a manner that the $AlO_4$ part of the complex has one net negative valence unit. It is postulated that an acidic hydrogen ion is associated with the oxygen atom surrounding the aluminum atom. The acidity of other catalysts of this type may be similarly explained. It is also important to note that these catalysts will maintain their acidity at high temperature. Catalysts composed of silica and certain other oxides, composited to evince acidic properties and hydrocarbon cracking activity, are among the best catalysts known for isomerization of olefins. Other work has shown that the incorporation, in these catalysts, of a component having activity for promoting hydrogenation, such as a metal or salt of a metal of the iron group, enhances the efficiency of isomerization processes in which low-boiling saturated hydrocarbons are employed as the feed stock. For example, Calhoun et al. in U.S. Patent 2,324,762 describe an isomerization process in which a catalyst, composed of metallic nickel, cobalt, or iron deposited or impregnated upon a hydrohalide-treated alumino-silicate clay, is employed in the isomerization of paraffinic hydrocarbons containing at least four carbon atoms per molecule. In addition, Ciapetta and Hunter comprehensively discuss the isomerization of saturated hydrocarbons in the presence of hydrogenation cracking catalysts in Industrial & Engineering Chemistry, 45 (1) at pages 147–165. These isomerization processes were carried out in the presence of added amounts of hydrogen, and the catalysts described by these prior art workers were very effective in promoting the isomerization reactions.

It has been found, however, that these catalysts, although effective for isomerization, also promote considerable hydrocracking, and that the extent of hydrocracking is quite sensitive to small increases in temperature. Thus, if temperatures are raised slightly above the temperature at which high isomerization conversion occurs and at which small amounts of hydrocracking take place, the rate of hydrocracking increases markedly at the expense of isomerization, with resulting loss in selectivity for isomerization. Moreover, since hydrocracking is exothermic in nature, hot zones may develop in the catalyst which tend to destroy its overall activity.

According to this invention, it has been found that hydrocracking effected by isomerization catalysts composed of refractory, mixed oxides supports composited to evince acidic properties and hydrocarbon cracking activity and, small amounts of a Group VIII metal of the iron period and salts thereof having hydrogenation activity, may be effectively mitigated by introducing into the catalyst composition, as a stabilizing agent, small amounts of lithium oxide. It is therefore an object of this invention to provide a process for isomerizing low-boiling saturated hydrocarbons in the presence of a catalyst containing a refractory, mixed oxides support, composited to evince acidic properties and hydrocarbon cracking activity. It is a further object of this invention to enhance the effectiveness of composite catalysts comprising a refractory mixed oxides support composited to evince acidic properties and hydrocarbon cracking activity and metallic cobalt, nickel and/or iron, or salts thereof, having hydrogenation activity, by incorporating into the catalyst composition small amounts of lithium oxide. It is a further object of this invention to provide a process for increasing the octane number of low-boiling, straight-run petroleum distillates by contacting these distillates with a composite catalyst comprising a refractory, mixed oxides support composited to evince acidic properties and hydrocarbon cracking activity, one or more Group VIII metals of the iron period, or salts thereof, having hydrogenation activity, and small amounts of lithium oxide.

According to this invention, hydrocracking during the isomerization of a low-boiling, saturated-hydrocarbon-containing feed stock in the presence of a catalyst composed of a refractory, mixed oxides support, composited to evince acidic properties and hydrocarbon cracking activity and a Group VIII metal of the iron period, and/or salts thereof, having hydrogenation activity, is substantially prevented or mitigated by incorporating in the catalyst composition a small amount of lithium oxide, sufficient to suppress the hydrocracking but not in excess of about 1% by weight, based on the composite catalyst. The isomerization process is carried out in the presence of hydrogen, at temperatures between about 600°–800° F., pressures between about 100–1000 p.s.i., and liquid hourly space velocities between 0.5–10.

The catalyst employed in the instant invention may be prepared by various well-known catalyst preparation expedients. The portion of the catalyst comprising the refractory, mixed oxides support composited to evince acidic properties and hydrocarbon cracking activity can consist of proprietary compounds, such as silica-alumina, or silica-zirconia compositions, which are readily available as cracking catalysts, as well as other acidic oxide composites. If the selected promoter is a Group VIII metal of the iron period, it can be combined with the support portion of the catalyst, e.g., silica-alumina, by impregnating the latter constituent with a readily reducible water-soluble salt of the desired material. After the selected salts have been introduced, the composite is dried and heated to an elevated temperature sufficient to convert the metallic salts to the oxide. The oxide is then reduced to the metallic state by heating the composited catalyst in the presence of hydrogen at an elevated temperature for a time sufficient to effect this reduction. The lithium oxide can be included in the composition by impregnating the support with a solution of a readily-discomposable salt of lithium. When the dried composition is calcined, the lithium salt is converted to the oxide. This can be effected separately or simultaneously with the incorporation of the Group VIII metal, even though subsequent reduction steps are carried out as a part of the catalyst preparation, since the lithium oxide component is reduced only at more severe reducing conditions. A preferred method is to impregnate a finely-divided, refractory, mixed oxides support composited to evince acidic properties and hydrocarbon cracking activity with a mixed solution of nickel and lithium nitrate. The salt-containing support is then contacted with ammonium carbonate to form within the support network nickel and lithium carbonates. The catalyst is then dried and pelleted. Activation is then carried out by slowly calcining the dried composite in the presence of hydrogen to decompose the carbonates and reduce the oxides so formed. This is accomplished by slowly heating the mass to about 1000° F., thereby avoiding migration of the activated promoters, and sintering. Rather than employing a finished refractory, mixed oxides support (composited to evince acidic properties and hydrocarbon cracking activity) as a carrier, internal deposition, in which uniform distribution of the metallic promoters throughout the carrier is obtained, can also be achieved by the simultaneous precipitation of the catalyst constituents during the hydrosol, or gel, phase of the catalyst preparation. In preparing catalysts promoted with Group VIII metal salts, prior art techniques such as those described by Emmett, "Catalysis," Reinhold Publishing Co. (1955), can be used and the lithium oxide incorporated in the composition as above or in any other desirable manner. In the catalyst of this invention, the composition of the support may vary within wide limits, provided that the finished support composition has the necessary acidic properties and hydrocarbon cracking activity. Also, the amount of Group VIII metal of the iron period, or salts thereof, can vary, but is generally in the range of 2–7% by weight (as metal), of the catalyst composition. Only small amounts of lithium oxide are required, and not more than about 1.0 weight percent should be incorporated in the catalyst composition. It is preferred that the lithium oxide be present in amounts between about 0.05–0.5% by weight of the catalyst composition. Amounts of lithium oxide substantially in excess of 1% are to be avoided in order to prevent inimically affecting the isomerization activity of the catalyst.

In carrying out the process of this invention, silica-alumina compositions in the form of proprietary cracking catalysts of high surface area are very effective as the catalyst support. In such catalysts, the alumina content may vary between 5–35%, but is preferably in the range of 12–30%. It is also within the scope of this invention to employ other types of silica-alumina catalyst combinations, such as acid-treated hydroalumino-silicates found either in the natural form as types of clay, or synthetically produced. When silica-alumina carriers in the form of cracking catalysts are used, they can contain up to about 5% of other promoting agents, e.g., the oxides of Be, Mg, B, Ti, and Zr, which are used for enhancing the cracking efficiency of such catalysts. Also, such proprietary compositions may contain trace amounts of sodium or potassium which can be tolerated in the composition of this invention without causing deleterious effects. Excellent results are also obtained using silica-zirconia compositions as supports, with the zirconia content preferably being about 5 to 35% by weight. Catalysts of this nature can be prepared by forming a high-surface-area silica gel by the addition of acid to sodium silicate. The zirconia is then added to the gel, either in a wet or calcined state, by impregnation and subsequent decomposition, or by precipitation. In general, however, examples of suitable refractory, mixed oxides supports composited to evince acidic properties and hydrocarbon cracking activity include, but are not limited to, $SiO_2$—$Al_2O_3$, $SiO_2$—$ZrO_2$, $SiO_2$—$TiO_2$, $SiO_2$—$B_2O_3$, $Al_2O_3$—$ZrO_2$, $Al_2O_3$—$BeO$, $Al_2O_3$—$B_2O_3$, $SiO_2$—$Cr_2O_3$, $B_2O_3$—$TiO_2$, $SiO_2$—$Al_2O_3$—$ZrO_2$, $SiO_2$—$Al_2O_3$—$BeO$, and acid-treated clays. These mixed oxides can be either chemically or physically combined in forming the base. Examples of Group VIII metals of the iron period and their salts include metallic iron, nickel, cobalt, nickel molybdate, nickel tungstate, nickel chromate, nickel borate, nickel phosphate, cobalt molybdate, cobalt tungstate, etc.

The advantages of the instant invention will be apparent from the following examples:

A synthetic charge stock, consisting of 25 volume percent each of n-pentane, n-hexane, n-heptane and cyclohexane, and having a research octane rating of 45, was passed with hydrogen (in a mol ratio of hydrogen to hydrocarbon of 3.5) at isomerization conditions of 650° F., a pressure of 250 p.s.i.g. and at a liquid volume hourly space velocity of 1.0, over a catalyst consisting of 5 weight percent nickel and 0.1 percent lithium oxide on a silica-alumina (25% alumina) cracking catalyst support. The catalyst had been activated previously by slowly heating in hydrogen to 975° F. to decompose the nickel and lithium salts. Under the above conditions, extensive isomerization with minimum hydrocracking took place, resulting in a stabilized liquid product of 69 research octane rating. The yield of product was 96 weight percent of the charge.

In another run under the same conditions, the same charge stock was passed over a similar catalyst, except that no lithium oxide had been incorporated into the catalyst. A liquid product of 71 octane rating was obtained. This product was of considerably lower gravity, and amounted to only 92 weight percent of the charge. These data show the effect of added lithium oxide for minimizing hydrocracking during the isomerization by the improved yields of liquid product obtained. The catalyst is also stabilized in that hot zones due to excessive hydrocracking, which tend to lower the overall activity of the catalyst, are prevented from occurring.

A similar comparison was made between a catalyst comprised of 5% nickel on a silica-alumina (13% alumina) cracking catalyst support, and a catalyst of similar preparation, except that lithium oxide was incorporated at a concentration corresponding to 0.1% lithium. Again, although the octane ratings of the products from the two catalysts were about equivalent, the catalyst containing lithia gave better yields of liquid product and was less susceptible to hot zones resulting from excessive hydrocracking.

As an illustration of the effectiveness of silica-zirconia supports for catalysts used in the process of this invention, n-heptane was isomerized at 500° F. and atmospheric pressure over a catalyst composed of 5% nickel on a support composed of 65% silica and 35% zirconia. This investigation was carried out using a liquid volume hourly space velocity of 0.5 and hydrogen/hydrocarbon mol ratio of 3.2. Under these conditions, an 87 weight percent yield of stabilized isomerate product was obtained, having an octane number (blended in 50–50 volume proportions with iso-octane) of 56. Isomerization of n-heptane under the same conditions over a catalyst composed of 5% nickel and 0.4 lithia on a support of 65% silica and 35% zirconia resulted in a 90 weight percent yield of isomerate liquid having a blended octane rating of 58. On a comparable octane basis, the yield of product of blended octane rating of 58 would be only 79 weight percent with the catalyst containing no lithia. The octane number of the finished product would have been substantially higher had the isomerization been conducted at higher temperatures and pressures. These data, however, illustrate the advantage which obtains through incorporating small amounts of lithium oxide in the catalyst employed in the process of this invention.

The foregoing are only illustrative and nonlimiting examples of the instant invention. Although specific reaction conditions are shown, it is intended that the subject process may be carried out employing other types of feed stock as well as other operating conditions.

In carrying out the instant invention, isomerization of the feed stock is effected at a temperature of 600–800° F., preferably 650–750° F. Pressures of 100–1000 p.s.i. and preferably 200–500 p.s.i. are used, and liquid hourly space velocities of 0.5–10, preferably 1–5, can be employed. This condition, which correlates a number of variables, is the liquid volume at 60° F. of limiting reactant fed per unit volume of effective reaction zone or catalyst bed. To suppress cracking and coke deposition, the process is carried out in the presence of hydrogen, of which about 1–15 mols per mol of hydrocarbon feed stock are used.

Conventional processing equipment may be used in the subject isomerization process. Fixed-bed operation can be employed because of the relatively long life of the catalysts of this invention. However, a continuous, moving-bed catalyst system is also suitable. In the regeneration of the catalyst, the spent catalyst is first treated with an oxidizing gas, at temperatures not to appreciably exceed 975° F., to remove the carbonaceous materials deposited thereon. The decarbonized catalyst is then subjected to a reduction step for completing the revivification.

The feed stocks which are used in the instant invention are those low-boiling hydrocarbons or petroleum hydrocarbon distillates which contain substantial amounts of paraffinic hydrocarbons not normally susceptible to being suitably processed in conventional reforming processes. Such stocks include normal paraffins containing not more than about 7 carbon atoms per molecule, as well as straight-run, light petroleum distillates boiling between about 100° and 250° F. which contain these normal paraffins.

From the foregoing description of this invention it is seen that applicants have discovered, for use in a vapor-phase isomerization process for the processing of isomerizable saturated paraffinic hydrocarbons, composite catalysts consisting of a refractory, mixed oxides support composited to evince acidic properties and hydrocarbon cracking activity, a Group VIII metal of the iron period, or salt thereof, and a small amount of lithium oxide. This catalyst composition evinces its desirable attributes by mitigating hydrocracking reactions which tend to lower the overall selectivity of the catalyst. The unusualness of results of this invention are further emphasized by the presence of less than 1% by weight of lithium oxide in the isomerization catalyst. While it is recognized that isomerization is promoted by acid catalysts such as silica-alumina and others, it is also known that the presence of alkalis inhibits the isomerization. However, according to this invention it has been found that when small amounts of lithium oxide are added as a stabilizing agent to the basic catalyst composition, which comprises a refractory, mixed oxides support composited to evince acidic properties and hydrocarbon cracking activity and a Group VIII metal of the iron period or salt thereof, its efficacy as an isomerization catalyst is enhanced by permitting the isomerization reaction to be carried out at higher temperatures without hydrocracking or deleteriously affecting the isomerization activity of the catalyst.

This application is a continuation-in-part of U.S. patent application Serial Number 527,417 filed August 9, 1955, now abandoned.

Therefore, we claim as our invention:

1. A process for the catalytic isomerization of isomerizable low-boiling hydrocarbons which comprises contacting a normal paraffinic hydrocarbon containing not more than about 7 carbon atoms per molecule with a composite isomerization catalyst containing a major portion of a refractory, mixed oxides support composited to evince acidic properties and hydrocarbon cracking activity, having incorporated therein 2–7% by weight based on the metal content thereof, of a promoter selected from the group consisting of Group VIII metals of the iron period and salts thereof, and lithium oxide in an amount from about 0.05 to 1.0% w. sufficient to substantially prevent hydrocracking, in the presence of hydrogen, at a temperature of about 600°–800° F., a pressure of about 100–1000 p.s.i., and liquid hourly space velocity of 0.5–10.

2. A method in accordance with claim 1 in which said promoter is selected from the group consisting of metallic nickel and nickel salts.

3. A process for improving the octane number of a light petroleum distillate boiling between about 100°–250° F., said distillate containing isomerizable low-boiling hydrocarbons containing not more than about 7 carbon atoms per molecule, which comprises contacting said distillate with a composite siliceous isomerization catalyst, containing 5–35% by weight of an oxide selected from the group consisting of zirconia and alumina, and having incorporated therein 2–7% by weight, based on the metal content thereof, of a promoter selected from the group consisting of Group VIII metals of the iron period and salts thereof, and lithium oxide in an amount from about 0.05 to 1.0% w. sufficient to substantially prevent hydrocracking, in the presence of hydrogen, under conditions of temperature and pressure to effect the isomerization of said paraffinic hydrocarbons.

4. A method in accordance with claim 3 in which the promoter is selected from the group consisting of metallic nickel and nickel salts.

5. A process for improving the octane number of a light petroleum distillate boiling between about 100°–250° F., said distillate containing isomerizable low-boiling hydrocarbons containing not more than about 7 carbon atoms per molecule, which comprises contacting said distillate with a composite siliceous isomerization catalyst, containing 5-35% by weight of an oxide selected from the group consisting of zirconia and alumina, and having incorporated therein 2-7% by weight, based on the metal content thereof, of a promoter selected from the group consisting of Group VIII metals of the iron period and salts thereof, and lithium oxide in an amount from about 0.05 to 1.0% w. sufficient to substantially prevent hydrocracking, in the presence of hydrogen at a temperature of about 600°–800° F., a pressure of about 100–1000 p.s.i., and a liquid hourly space velocity of 0.5–10.

6. A method in accordance with claim 5 in which said promoter is selected from the group consisting of metallic nickel and nickel salts.

References Cited in the file of this patent

UNITED STATES PATENTS

| | | |
|---|---|---|
| 2,320,118 | Blaker | May 25, 1943 |
| 2,550,531 | Ciapetta | Apr. 24, 1951 |
| 2,592,603 | Sanford et al. | Apr. 15, 1952 |
| 2,635,123 | Kennedy | Apr. 14, 1953 |
| 2,651,598 | Ciapetta | Sept. 8, 1953 |
| 2,762,854 | McKinley | Sept. 11, 1956 |
| 2,798,105 | Heinemann et al. | July 2, 1957 |